(No Model.)

M. C. ROOT
WHEEL.

No. 404,657. Patented June 4, 1889.

WITNESSES
Carroll J. Webster
Anna Leharvey

INVENTOR
Miles C. Root
By William Webster
Atty

UNITED STATES PATENT OFFICE.

MILES C. ROOT, OF TOLEDO, OHIO.

WHEEL.

SPECIFICATION forming part of Letters Patent No. 404,657, dated June 4, 1889.

Application filed November 12, 1888. Serial No. 290,539. (No model.)

*To all whom it may concern:*

Be it known that I, MILES C. ROOT, a citizen of the United States, and a resident of Toledo, in the county of Lucas and State of Ohio, have invented certain new and useful Improvements in Metal Wheels; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to metal wheels for vehicles, and especially such wheels as are used for children's carriages, velocipedes, bicycles, wheelbarrows, &c., and has for its object to simplify the construction and lessen the expense of the product, as well as to construct a wheel of great strength and durability.

A further object is to construct the spokes and rim entirely of wire, thereby not only providing for proper tension evenly distributed upon each spoke while constructing the wheel, but for a rim that shall possess great rigidity and strength.

The construction consists in the parts and combination of parts hereinafter described, and pointed out in the claims.

In the branch of the art to which my invention belongs it has been usual to construct the wheel of several sections adapted to be so closely assembled as to hold the wire spokes by impinging into the same, or by such frictional embrace as to flatten the spoke with the outer end of the spoke riveted to a metal band or tire. The great objections to this construction are, first, the necessity of impinging into the spoke fractures the sides thereof and causes the spoke to be easily broken, or when held frictionally within the hub the necessary flattening of the wires causes the same result; secondly, in the process of riveting the spokes to the rim or tire the tire must necessarily be held firmly by jaws which impinge into the spoke, causing it to be greatly weakened at the point of the greatest strain. These objections are entirely overcome by the herein-described method of forming the rim or tire and the spokes of an integral coil of wire, with the central portion of each spoke resting within spiral grooves or corrugations formed upon the periphery of the hub, and held in place by collars upon each end of the hub.

Figure 1:
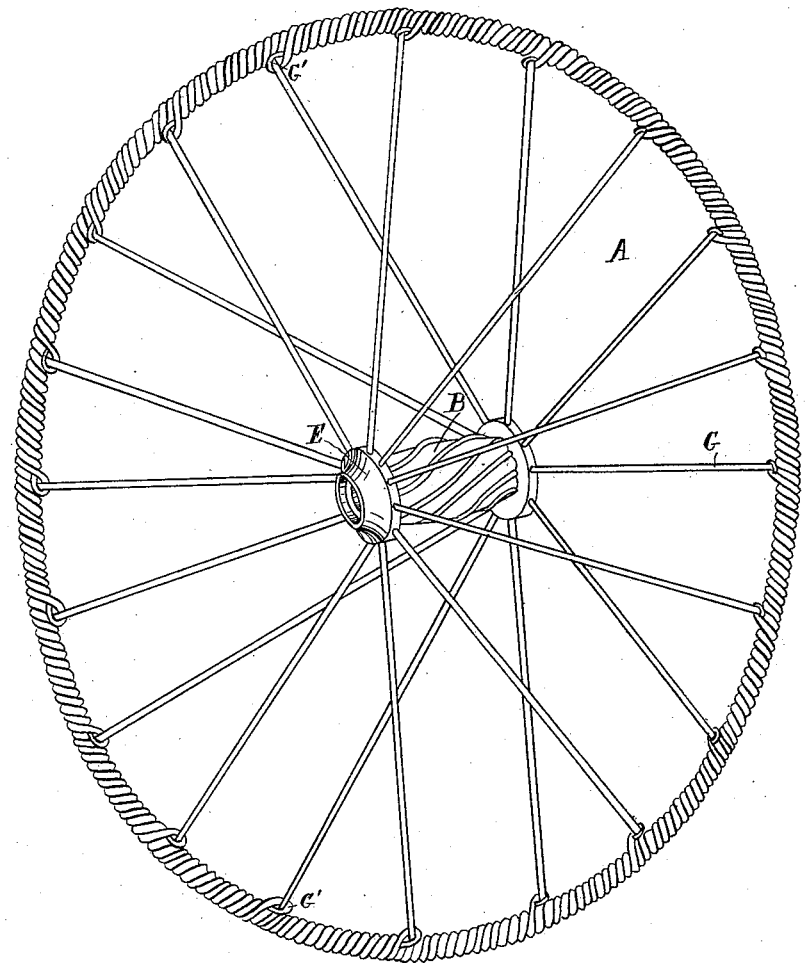
Figure 2:
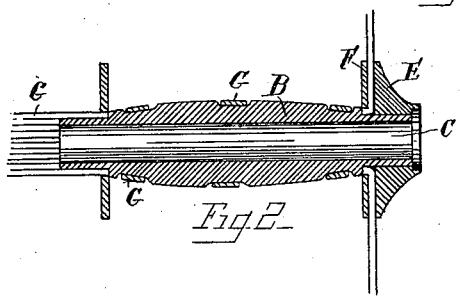
Figure 3:
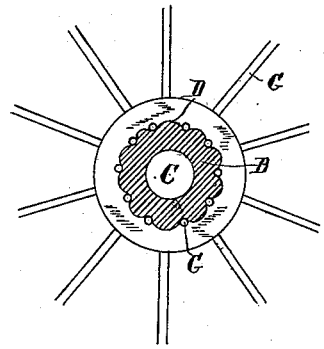

In the drawings, Figure 1 is an elevation of a complete wheel formed in accordance with my invention. Fig. 2 is a diametrical sectional view of the hub taken through its axis. Fig. 3 is a transverse section through the hub midway its length.

A designates the wheel formed of a hub B, having an axial opening C for the reception of the axle-spindle, and with a corrugated periphery, the corrugations D being preferably spirally arranged and terminating at a distance from the ends of the hub to allow the reception of caps E when a complete finish to the wheel is desired.

F designates collars, one of which is placed upon each end of the hub and rests against the ends of the corrugations, being intermediate the same and caps E.

G designates the spokes formed of wire and bent at right angles centrally to form return-spokes, the central portion being of the length of the corrugated portion of the hub, the opposite end of each spoke being of a length sufficient to be incorporated into the rim or tire H and form an integral part, as will be more fully described.

In assembling the parts to form a complete wheel the central portions of the spokes are laid within the corrugations and collars G placed upon the hub and encircling the wires, as shown at the left in Fig. 2, after which the wires are bent at right angles to the hub and are incorporated into the coil of the rim or tire.

If it is desired to form the tire of four strands of the spoke-wires, each strand is of a length to be incorporated and extend beyond the next succeeding four spokes and be discontinued by bending the end to form an eye G' to embrace the spoke. If it is desired to form the rim with more or less strands than has been mentioned, the number is determined by the length of each spoke-wire.

To complete the finish of the wheel, caps E are placed upon the wheel, and the entire wheel may be then tinned, japanned, painted, or finished in any desired manner, the tinning process being preferred, as it unites the strands into a complete union.

If desired, the spokes may be bent to the desired shape, and the hooks G' formed upon the ends prior to their being secured upon the hub, in which event a two-part collar is used and encircles the spokes, the collars being joined after being placed upon the hub, which can be done by screws or rivets which pass through each half of the collar, or in any preferred manner.

It will be seen that the act of winding the spokes to form the spiral rim or tire puts each spoke in equal tension, the tension being regulated by the tightness of the coil.

What I claim is—

1. In a metal wheel, a rim and spokes formed integral by coiling the ends of the spokes to form the rim, as and for the purpose set forth.

2. In a metal wheel, a hub, in combination with spokes formed with horizontal portions confined upon the hub and bent at right angles thereto and spirally twisted to form a rim or tire, as and for the purpose set forth.

3. In a metal wheel, a hub, in combination with spokes secured to the hub and twisted at their free ends to form a rim or tire, each spoke being secured to any desired succeeding spoke, as and for the purpose set forth.

In testimony that I claim the foregoing as my own I hereby affix my signature in presence of two witnesses.

MILES C. ROOT.

Witnesses:
WILLIAM WEBSTER,
ANNA LEHANEY.